United States Patent
Beranger et al.

(10) Patent No.: US 11,738,651 B2
(45) Date of Patent: Aug. 29, 2023

(54) FLYING DEVICE

(71) Applicant: COMMISSARIAT A L'ENERGIE ATOMIQUE ET AUX ENERGIES ALTERNATIVES, Paris (FR)

(72) Inventors: Bruno Beranger, Grenoble (FR); Daniel Chatroux, Grenoble (FR); Mathias Gerard, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 172 days.

(21) Appl. No.: 16/975,593

(22) PCT Filed: Feb. 25, 2019

(86) PCT No.: PCT/FR2019/050421
§ 371 (c)(1),
(2) Date: Aug. 25, 2020

(87) PCT Pub. No.: WO2019/166724
PCT Pub. Date: Sep. 6, 2019

(65) Prior Publication Data
US 2020/0391600 A1    Dec. 17, 2020

(30) Foreign Application Priority Data
Feb. 27, 2018   (FR) ...................... 1851741

(51) Int. Cl.
*H02J 7/00* (2006.01)
*B60L 53/126* (2019.01)
(Continued)

(52) U.S. Cl.
CPC ............... *B60L 53/126* (2019.02); *B60L 5/42* (2013.01); *B60L 53/14* (2019.02); *B60L 2200/10* (2013.01); *B64U 50/34* (2023.01)

(58) Field of Classification Search
CPC ...... B60L 53/126; B60L 5/42; B60L 2200/10; B64C 2201/066
(Continued)

(56) References Cited

U.S. PATENT DOCUMENTS 4,839,600 A * 6/1989 Kuurstra ................ G01R 11/02
336/175
7,318,564 B1 * 1/2008 Marshall ................ B60L 53/11
244/12.3
(Continued)

FOREIGN PATENT DOCUMENTS

| CN | 103872795 B | 6/2016 |
| CN | 105882990 A | 8/2016 |
| WO | WO 2016/103264 A1 | 6/2016 |

OTHER PUBLICATIONS

Humphries, M., "MIT teaches a drone to perch on power lines so it can recharge during flight," Geek.com, Jun. 23, 2014, https://www.geek.com/chips/mit-teaches-a-drone-toperch-on-power-lines-so-it-can-recharge-during-flight-1597462/, XP055523524. (9 total pages).

(Continued)

*Primary Examiner* — Zixuan Zhou
(74) *Attorney, Agent, or Firm* — Oblon, McClelland, Maier & Neustadt, L.L.P.

(57) ABSTRACT

A flying device includes a mechanical coupling that is designed to cooperate with a cable of an electrical distribution line in such a way that the flying device remains secured to the cable in a rest position.

15 Claims, 10 Drawing Sheets

(51) Int. Cl.
*B60L 5/42* (2006.01)
*B60L 53/14* (2019.01)
*B64U 50/34* (2023.01)

(58) Field of Classification Search
USPC ................. 320/108, 109; 701/22; 307/104
See application file for complete search history.

(56) References Cited

U.S. PATENT DOCUMENTS

| | | | |
|---|---|---|---|
| 7,714,536 B1 * | 5/2010 | Silberg | B60L 50/90 |
| | | | 320/108 |
| 9,421,869 B1 * | 8/2016 | Ananthanarayanan | B64D 5/00 |
| 2012/0218114 A1 * | 8/2012 | Davis | G01R 19/2513 |
| | | | 340/646 |
| 2015/0137596 A1 * | 5/2015 | Steiner-Jovic | H02J 50/001 |
| | | | 307/24 |
| 2016/0137311 A1 * | 5/2016 | Peverill | B60L 53/14 |
| | | | 701/16 |
| 2017/0015414 A1 * | 1/2017 | Chan | H02G 1/02 |
| 2017/0021943 A1 | 1/2017 | Peverill et al. | |
| 2017/0021944 A1 | 1/2017 | Peverill et al. | |
| 2017/0023948 A1 | 1/2017 | Peverill et al. | |
| 2021/0354819 A1 * | 11/2021 | Hiller | H02J 50/402 |

OTHER PUBLICATIONS

International Search Report dated Apr. 16, 2019 in PCT/FR2019/050421 filed on Feb. 25, 2019, 3 pages.
French Search Report (with translation of categories) dated Nov. 13, 2018 in French Application No. 1851741 filed on Feb. 27, 2018, 3 pages.

* cited by examiner

FLYING DEVICE

TECHNICAL FIELD

The present invention relates to an electrically propelled flying device. In particular, the present invention relates to an electrically propelled flying device provided with a mechanical coupling means for maintaining said device on a cable of an electric distribution line. In particular, the mechanical coupling means is implemented to put the flying device into a rest position and to protect it from vandalism.

The flying device can also comprise a system for charging its onboard battery. In this respect, the charging system is arranged to collect energy necessary for charging the battery at an electric distribution line in order to charge the battery.

The present invention especially relates to drone-type flying objects, for monitoring electric distribution lines such as high voltage lines. It especially makes it possible to contemplate management of autonomy of these flying objects as well as their safety when they do not fly.

Prior Art

Charging a rechargeable battery of equipment, especially a Li-ion battery, implements a charging system for injecting an electric charging current opposite to the direction of use.

The charging system can involve a current generator which, when electrically connected to the rechargeable battery, supplies a charging current in said battery.

An inductive charging system (therefore requiring generating high frequency) for charging the rechargeable battery is provided in document CN 103872795.

Alternatively, charging the rechargeable battery can be performed by magnetic induction (CN103872795). In this respect, a magnetic inductive charging system comprises a first winding magnetically coupled with a second winding so that the flow of an alternating current in either of the first and second windings generates the flow of another alternating current in the other winding, and which is to be injected into the rechargeable battery.

According to a particular arrangement known from the state of the art, the first winding can be included in a base, and supplied by an alternating current source, whereas the second winding, connected to the rechargeable battery, can be included in the equipment. The equipment and base can especially comprise cooperating means for magnetically coupling the first and second windings during a charging phase of the battery. In particular, the magnetic coupling means can be arranged to put the first winding in proximity to the second winding. To minimize size of windings, the alternating current is preferentially of a high frequency greater than 20 kHz so that vibrations of windings are not audible. Within the scope of this prior art, electronics enable supply of the first winding to be managed if the second winding is present.

Thus, this arrangement, insofar as it does not require electric connections to be established between the base and the equipment, can advantageously be implemented for charging batteries for portable electric equipments, mobile phones, electric tooth brushes or even electric vehicles.

However, when it is equipment travelling over long distances, especially electrically propelled flying devices for monitoring electric distribution lines, this arrangement known from the state of the art is not satisfactory.

Indeed, during a flight for monitoring an electric distribution line, especially a high voltage line, the flying device may have to travel a large distance.

The limited autonomy of rechargeable batteries makes it necessary to regularly charge the latter during the reconnaissance flight.

To do so, carrying a charging base by the flying device can be considered so as to be able to regularly charge the battery.

However, the weight of the charging base is detrimental to the autonomy of the flying device, and limits the flying time accordingly between two charging phases of the rechargeable battery.

Furthermore, such a base generally requires a charging point specifically adapted to be electrically connected to a power supply source. To cover large distances, an infrastructure of charging points has then to be set up all along the line to ensure regular charging during the whole reconnaissance flight.

Document U.S. Pat. No. 7,318,564 discloses an electrically propelled flying device provided with a charging module for charging a rechargeable battery at a power transmission line. However, the module provided in this document, operating by induction, does not enable charging current of the battery to be regulated during the charging phase.

One purpose of the present invention is to provide a flying device likely to be got to safety, especially protected from vandalism.

Another purpose of the present invention is to provide an electrically propelled flying device the autonomy of which is not limited by carrying a charging base and which does not require setting up a particular infrastructure of charging points.

Another purpose of the present invention is to provide an electrically propelled flying device capable of charging its rechargeable battery at an electric distribution line.

DISCLOSURE OF THE INVENTION

The purposes of the present invention are, at least partly, achieved by a flying device comprising a mechanical coupling means arranged to cooperate with a cable of an electric distribution line so as to maintain the flying device integral with the cable in a rest position.

According to one implementation, the mechanical coupling means comprises a hook for hooking, advantageously in suspension, the flying device to the cable.

According to one implementation, the mechanical coupling means comprises a clamp provided with at least two clamp grippers to hook the flying device to the cable.

According to one implementation, the coupling means is fitted with a rolling means arranged to enable the flying device to be moved along the cable of the distribution line.

According to one implementation, the flying device is electrically propelled.

According to one implementation, the flying device comprises:
  at least one rechargeable battery for supplying power necessary to electrically propel the flying device;
  means for charging the at least one battery included in the magnetic coupling means, the charging means being adapted, as soon as the cable is passed through by a current called a line current, to cooperate, advantageously magnetically, with said cable in order to charge the at least one battery.

According to one implementation, the charging means comprise at least one winding having two main ends, respectively called a first end and a second end, the at least one winding being arranged to be magnetically coupled with the cable as soon as a cooperation between the mechanical coupling means and the cable occurs so as to inductively cause a current, called an induced current, to flow in the at least one winding and for charging the at least one battery.

According to one implementation, the at least one winding forms the hook.

According to one implementation, the at least one winding forms at least one of the grippers of the clamp.

According to one implementation, the charging means comprise a current rectifier arranged to rectify the induced current into a d.c component current, called a charging current, before being injected into the at least one battery.

According to one implementation, the rectifier comprises at least one diode, advantageously the rectifier comprises two diodes, still more advantageously, the rectifier comprises a diode arrangement forming a Graetz bridge.

According to one implementation, the charging means comprise short-circuiting means adapted to short-circuit the charging means, advantageously the short-circuiting means are adapted to short-circuit the charging means as soon as the at least one battery, during a charging phase, has reached a charge at least equal to a predetermined charge, still more advantageously the predetermined charge corresponds to a full charge of the at least one battery.

According to one implementation, the short-circuiting means are arranged to short-circuit the at least one winding.

According to one implementation, the short-circuiting means are arranged to short-circuit the current rectifier, advantageously the charging means comprise a diode for preventing a discharging current of the battery from flowing in the short-circuiting means as soon as the current rectifier is short-circuited.

According to one implementation, the charging means comprise regulating means for limiting the charging current, advantageously the regulating means are adapted to perform chopping of either of the induced and charging currents.

According to one implementation, the charging means are disposed into a Faraday cage provided with an electrode arranged to be in contact with the cable as soon as the flying device is hooked to the cable, advantageously the electrode is disposed at the mechanical coupling means.

The invention also relates to an electrically propelled flying device comprising:
  at least one rechargeable battery having two main terminals respectively called, a first and a second terminals;
  means for charging the rechargeable battery which comprise a mechanical coupling means arranged to cooperate with a cable of an electric distribution line, a line current passing through said cable, cooperation between the mechanical coupling means and the cable being arranged to magnetically occur so as to charge the at least one rechargeable battery.

According to one implementation, the charging means comprise at least one winding having two main ends, respectively called a first end and a second end, the at least one winding being arranged to be magnetically coupled with the cable as soon as a cooperation between the mechanical coupling means and the cable occurs so as to inductively cause a current, called an induced current to flow in the at least one winding and for charging the at least one rechargeable battery.

According to one implementation, the charging means comprise a rectifier arranged to rectify the induced current into a d.c component current, called a charging current, before being injected into the at least one rechargeable battery.

According to one implementation, the current rectifier comprises a Graetz bridge.

According to one implementation, the current rectifier comprises a diode, called a forward diode $D1$, arranged according to a polarity for charging the at least one battery by the charging current.

According to one implementation, the current rectifier further comprises another diode, called a reverse diode $D2$, also arranged according to a polarity for charging the at least one battery by the charging current.

According to one implementation, the at least one winding is connected to the at least one battery via two branches respectively called, a first branch and a second branch to the at least one battery, the forward diode is mounted to either of the first and second branches, whereas the reverse diode is mounted to the other of the first and second branches.

According to one implementation, the at least one battery comprises two batteries respectively called, a first battery and a second battery, having a common node B.

According to one implementation, the at least one winding comprises a first winding and a second winding.

According to one implementation, the first winding and the second winding are arranged in series at a common node N, connected according to a main branch to the at least one rechargeable battery, the first end and second end are connected, along the first branch and the second branch respectively, to the at least one rechargeable battery.

According to one implementation, the main branch connects the common node N to a main terminal of the at least one battery, whereas the first branch and the second branch both respectively connect the first end and the second end to the other main terminal of the at least one battery.

According to one implementation, the main branch connects node N to node B, the first branch connects the first end to one of the main terminals, and the second branch connects the second end to the other of the main terminals, the first and second batteries being arranged either in series or according to opposite polarities.

According to one implementation, the first and second windings are free of a common node, the first winding being connected along the first branch to the first terminal, and along another branch, called a first secondary branch to the common node B, the second winding being connected along the second branch to the common node B, and along another branch, called a second secondary branch, to the second terminal, the first and second batteries being advantageously arranged in series.

According to one implementation, the first battery and the second battery are connected in series, the first branch and the second branch connecting the first end to the first terminal and second terminal, respectively, and a third branch connecting the second end to the common node B.

According to one implementation, the charging means comprise short-circuiting means adapted to short-circuit the charging means (300), advantageously the short-circuiting means are adapted to short-circuit the charging means as soon as the at least one rechargeable battery, during a charging phase, has reached a charge at least equal to a predetermined charge, still more advantageously the predetermined charge corresponds to a full charge of the at least one rechargeable battery.

According to one implementation, the short-circuiting means are arranged to short-circuit the at least one winding.

According to one implementation, the short-circuiting means are arranged to short-circuit the current rectifier, advantageously the charging means comprise a diode for preventing a discharging current of the rechargeable battery from flowing in the short-circuiting means as soon as the current rectifier is short-circuited.

According to one implementation, the charging means comprise regulating means arranged to limit the charging current, advantageously the regulating means are adapted to perform chopping of either of the induced and charging currents.

According to one implementation, the at least one winding is formed around a ferromagnetic element, the ferromagnetic element being sized so as to be brought to saturation at each half-cycle of the current of the line cable to limit durations of transferring energy from the cable to the charging means.

According to one implementation, the at least one winding, advantageously each winding of the at least one winding, is electrically connected in parallel with clipping means adapted to demagnetize the ferromagnetic element, advantageously, the clipping means comprise a resistor being variable as a function of a voltage imposed across its terminals.

According to one implementation, the mechanical coupling means comprises a hook for hooking, advantageously in suspension, the electrically propelled flying device to the cable, advantageously the at least one winding forms the hook.

According to one implementation, the mechanical coupling means comprises a clamp provided with at least two clamp grippers, advantageously the at least one winding forms at least one of the clamp grippers.

According to one implementation, the device is provided with means for measuring the induced current for tracking the state of charge of the at least one battery or for diagnosing the signature of the line current flowing in the cable of the line.

According to one implementation, the coupling means is fitted with a rolling means arranged to enable the electrically propelled flying device to be moved along the cable of the line.

According to one implementation, the charging means are disposed into a Faraday cage provided with an electrode arranged to be in contact with the cable as soon as the flying device is hooked to the cable, advantageously the electrode is disposed at the mechanical coupling means.

According to one implementation, the mechanical coupling means enable the flying device to be maintained in a rest position, advantageously when the charge of the at least one battery is full.

BRIEF DESCRIPTION OF THE DRAWINGS

Further characteristics and advantages will appear in the following description of a flying device according to the invention, given by way of non-limiting examples, with reference to the accompanying drawings in which:

FIG. 4 represents the current amplitude in the cable of line ($i_1$) and the induced current ($i_2$) amplitude as a function of time symbolized by the horizontal axis;

FIGS. 5a and 5b illustrate different arrangements for the short-circuiting means of the second winding or the input of the rectifier, and FIGS. 5c and 5d illustrate different arrangements for the means for regulating the charging current of the battery;

FIGS. 7a to 7c illustrate particular examples of short-circuiting means, whereas FIGS. 7d to 7g illustrate particular examples of regulating means;

DETAILED DISCLOSURE OF PARTICULAR EMBODIMENTS

Electrical distribution lines consist of towers supporting cables, in particular 3 phase cables and possibly a neutral cable. They are provided with electric insulator strings, especially of glass, which support these conventionally not insulated cables, air around the cable being used as an electric insulator against other cables and environment. To ensure a protection against lightning of cables through which the line current passes, an additional so-called earth cable is placed above them and it is connected to the towers and earth.

Thus, the present invention relates to an advantageously electrically propelled flying device, provided with at least one rechargeable battery and charging means. The charging means, for the purposes of the present invention, are adapted to enable the rechargeable battery to be charged at a cable of an electrical distribution line, in particular a high voltage distribution line, by magnetic induction effect at the frequency of the electric distribution.

According to the present invention, the charging means can comprise a winding and at least one current rectifier arranged so as to be able to be coupled with one of the cables of the electric distribution line, and thus collect energy at the electric distribution line for charging the rechargeable battery.

According to the present invention, and unlike solutions of prior art, the first winding (cable(s) of the electric distribution line) thereby always has an electric current passing therethrough. The flying device, for the purposes of the present invention, can adapt to the electric current flowing in the first winding.

Figure 1:
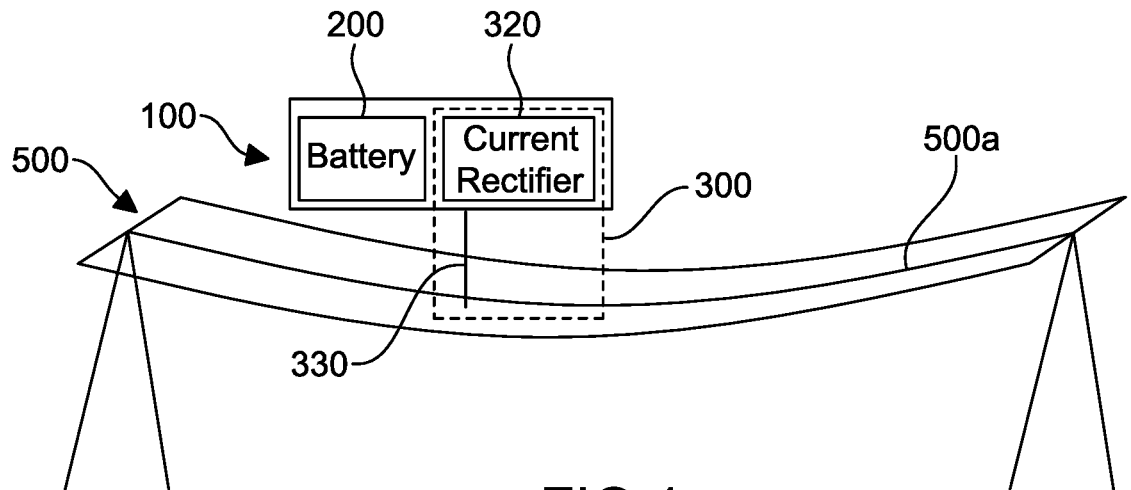
FIG. 1 is a functional schematic representation of an electrically propelled flying device according to the present invention, the frame in dashed lines delimiting the charging means.

In FIG. 1, a functional representation of an electrically propelled flying device 100 coupled with a cable 500a of an electric distribution line 500 can be seen.

By "electrically propelled flying device", it is meant for example a drone or any other remotely controlled or not remotely controlled flying device, and energy necessary for the electrical propulsion of which is provided by a battery on-board said device, in particular, for the purposes of the present invention, a rechargeable battery.

The rechargeable battery can be, for example, a lithium ion battery. However, the invention is applicable to any type of rechargeable battery.

It is also intended that each cable of the electric distribution line is a line having an alternating current passing therethrough, in particular an alternating current with a frequency between 40 Hz and 70 Hz.

The cable 500a of the electric distribution line 500 for the purposes of the present invention is also insulated from the other cables of the electric distribution line.

The electrically propelled flying device 100 comprises means for charging 300 the at least one rechargeable battery 200.

The at least one rechargeable battery 200 comprises two main terminals respectively called, a first terminal 200a and a second terminal 200b.

Figure 2:
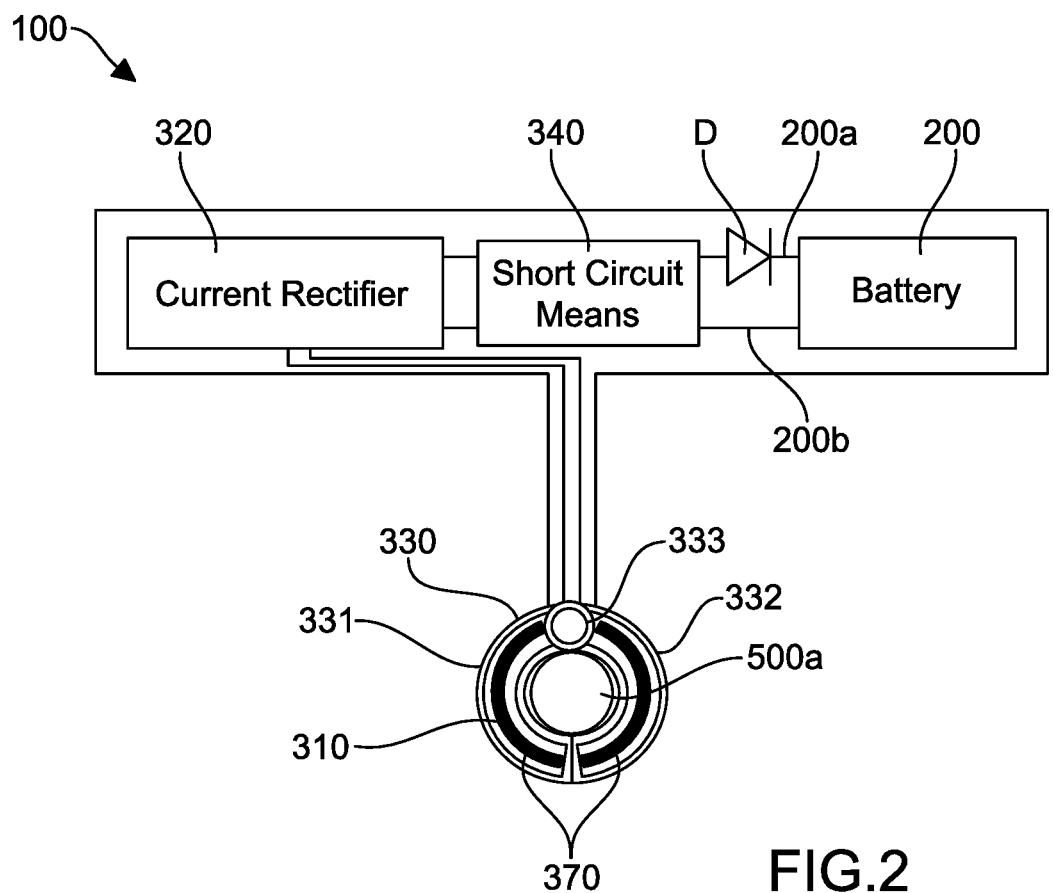
FIG. 2 is a schematic representation of an electrically propelled flying device, according to the present invention, hooked to a cable of the electric distribution line according to a first hooking example of said device.
Figure 3A:
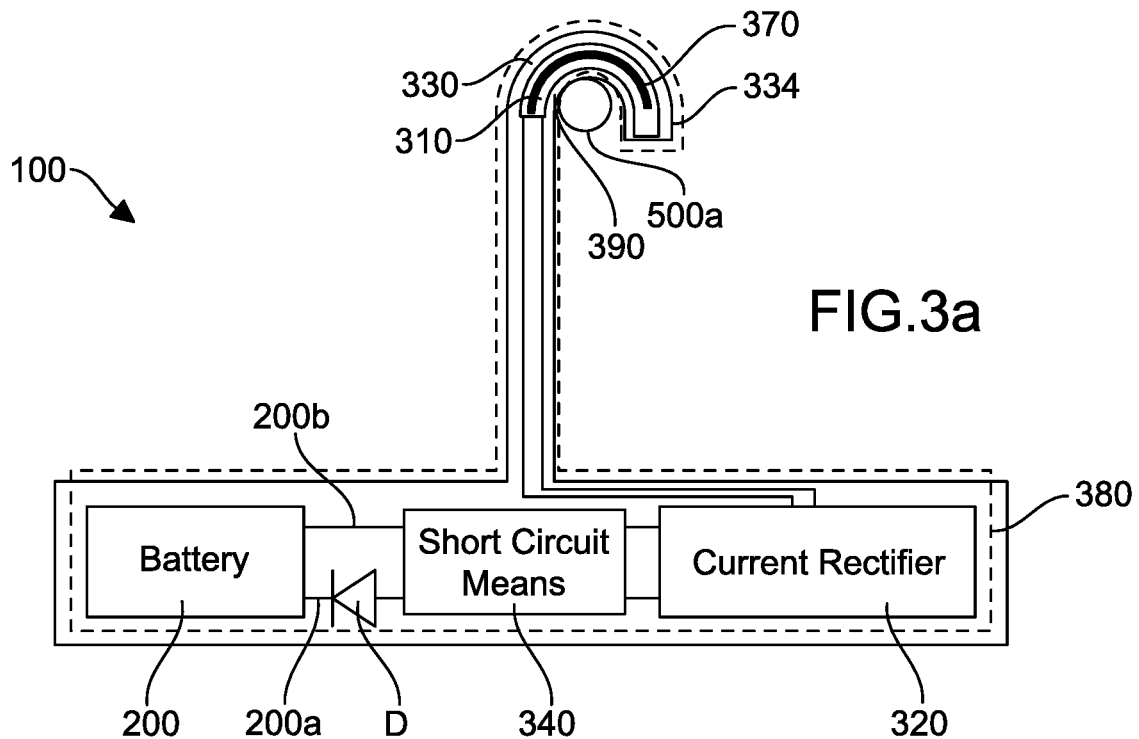
FIGS. 3a and 3b are schematic representations of an electrically propelled flying device, according to the present invention, hooked to an electric distribution line according to a second hooking example of said device, in both these FIGS. 3a and 3b, the flying device is provided with a full and partial Faraday cage, respectively, it is intended that either of the full or partial Faraday cages can be implemented for any of the embodiments of the present invention.
Figure 3B:
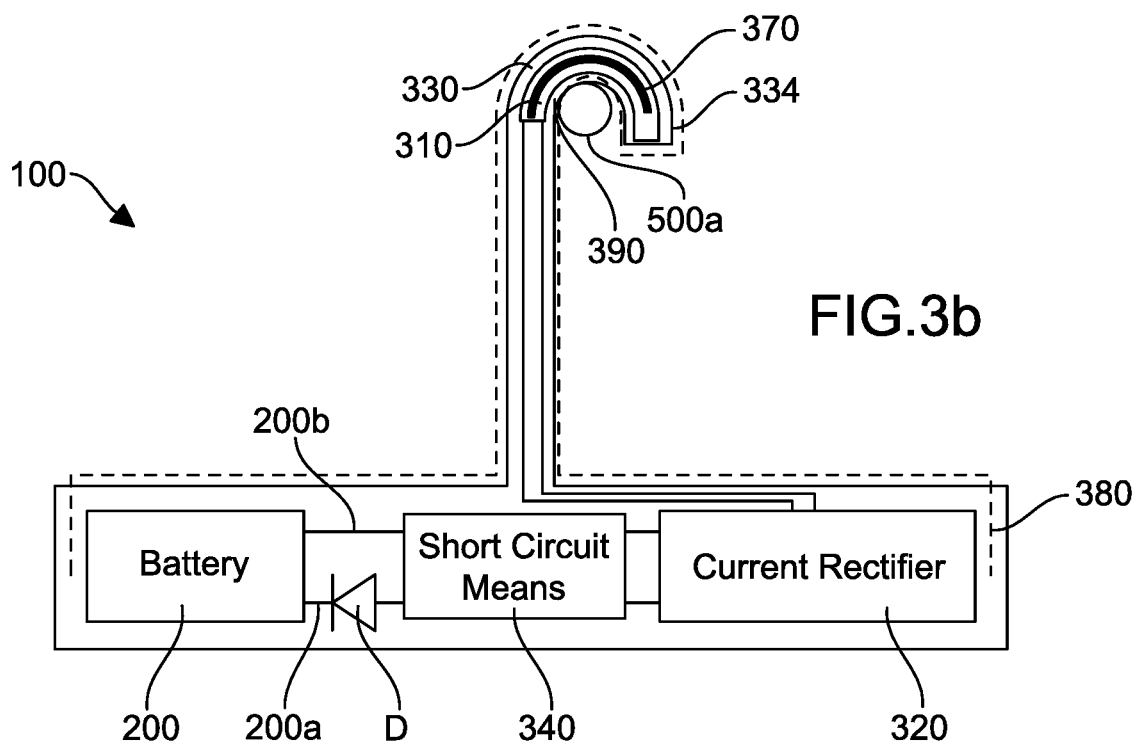

The charging means 300 can comprise at least one winding 310 and a current rectifier 320 (FIGS. 2, 3a and 3b).

The at least one winding 310 is made of a winding of a conducting wire, for example a copper wire. The conducting wire can be wound around a ferromagnetic element 370 which for example comprises iron. It is intended without needing to specify it that the conducting wire comprises two ends which are, in all the following of the present description called ends of the at least one winding 310. Preferably, the winding 310 is made around a sheet iron ferromagnetic element with a copper wire insulated by several successive layers of varnish, called in the electronics fields enameled copper wire.

The at least one winding 310 comprises two main ends respectively called a first end 311a and a second end 311b.

For the purposes of the present invention, the main ends of the at least one winding are two insulated ends, in other words, a common node between two windings cannot make up a main end for the purposes of the present invention.

Furthermore, at least one winding made of two windings without a common node, for the purposes of the present invention, also comprises two main ends. In this case, each of both windings comprises one of both main ends.

The current rectifier 320 can comprise two input terminals, called a first input terminal and a second input terminal respectively, and two output terminals called a first output terminal and a second output terminal respectively.

A current rectifier 320 for the purposes of the present invention is adapted to convert an alternating current into a direct current. In other words, the current rectifier 320 is arranged to transform an alternating current at the frequency of the distribution line flowing in the at least one winding 310 into a direct current for being delivered across the rechargeable battery 200. A direct current for the purposes of the present invention is a current flowing in only one direction.

The current rectifier 320, which will be described in more detail in the following statement of the present invention, can comprise a Graetz bridge, or even diodes.

The charging means 300 further comprise a coupling means 330.

The mechanical coupling means 330 is adapted to enable the flying device 100 to be hooked and/or held to one of the cables of the electric distribution line 500.

By "mechanical coupling means", it is meant a means for hooking said mean to a cable. In particular, hooking can be a fixed connection, a slide connection, a sliding pivot connection, the connection can be partial, via a hook, via a fork.

The mechanical coupling means 330 is adapted to couple the at least one winding 310 with the cable 500a of the electric distribution line 500 so that the alternating current, called a current of the line cable, flowing into said line cable 500 inductively causes a current, called induced current, to flow in the at least one winding 310. The induced current can then be rectified by the current rectifier 320 into a so-called charging current, for charging the rechargeable battery 200.

According to a first exemplary embodiment illustrated in FIG. 2, the mechanical coupling means 330 can comprise a clamp for example provided with two grippers 331 and 332 pivoting about an axis 333. The clamp can also comprise a larger number of grippers.

In particular, the at least one winding 310 can form at least one gripper of the clamp. Advantageously, the at least one winding is overmoulded with an insulating material, for example a polymeric and/or plastic material.

According to a second exemplary embodiment illustrated in FIGS. 3a and 3b, the mechanical coupling means 330 can comprise a hook 334. The hook 334 for example enables the flying device 100 to be suspended to the cable of the electric distribution line 500.

By "to suspend", it is intended holding the flying device under the cable (and to the cable) in the direction of gravity.

In particular, the at least one winding 310 forms the hook. Advantageously, the at least one winding 310 is overmoulded with an insulating material, for example a polymeric and/or plastic material.

According to these two exemplary embodiments, the mechanical coupling means 330 enables the flying device 100 and the cable 500a of the electric distribution line 500 to cooperate during a charging phase. Moreover, this coupling may be only mechanical then enabling the flight of the device to be stopped for being at rest safely. Indeed, this stop on a cable of an electric distribution line then also appears as an antitheft system for this flying object type having to make a stop kilometers away from his/her owner. This stop type is then possible regardless of whether the battery needs to be charged or not.

An alternative of this mechanical coupling is to be capable of enabling longitudinal movement of the electrically propelled flying device along the cable while remaining suspended without flying via a rolling means.

Particularly advantageously, the charging means 300 can be disposed into a Faraday cage 380 provided with an electrode 390 arranged to be in contact with the cable of the electric distribution line as the electrically propelled flying device is in an approach phase and/or hooked to the cable of the electric distribution line (in dashed lines in FIGS. 3a and 3b). Particularly advantageously, the electrode 390 can be disposed at the coupling means so that a contact is established between the electrode and the cable 500a of the line 500 from the coupling instant.

The Faraday cage 380 and its electrode 390 thus protect the charging means 300 and electric and electronic devices supplied by the battery 200 from effects of an electric arc which may happen when the electrically propelled flying device 100 approaches the cable of the electric distribution line 500.

The Faraday cage can be full (FIG. 3a), that is fully surrounding the charging means 300, the battery 200 and electric and electronic devices supplied by the battery 200, or partial (FIG. 3b), that is with a limited surface area to shield field lines of the distribution line or a surface area reduced to a shielding reference conducting plane. Preferably, one of the poles of the battery is connected to the total or partial Faraday cage to a conducting screen.

Advantageously, the charging means can also comprise short-circuiting means 340 (FIGS. 2, 3a and 3b) adapted to short-circuit the charging means 300. Short-circuiting the charging means 300 stops the process of charging the rechargeable battery 200.

Particularly advantageously, the short-circuiting means 340 are adapted to short-circuit the charging means as soon as the rechargeable battery 200, during a charging phase, has reached a charge at least equal to a predetermined charge.

In other words, the short-circuiting means 340 are arranged to switch off the charging current flowing in the battery as the state of charge of the latter has reached a predetermined state of charge.

The short-circuiting means 340 thus make it possible to prevent the at least one winding 310 from warming and/or being damaged as charging the rechargeable battery 200 is full. The short-circuiting means 340 furthermore make it possible to let the flying device 100 hooked to the cable of the electric distribution line during a rest phase of said device 100.

The predetermined charge is parameterized by the user of the flying device 100. Advantageously, the predetermined charge corresponds to a full charge of the rechargeable battery 200, determined from the voltage of the battery or over the integral of the current by the charging time.

Thus, unlike the solution provided in document U.S. Pat. No. 7,318,564, it is not necessary to disengage the flying device from the cable 500a as soon as charging the rechargeable battery 200 is full.

Figure 5A:
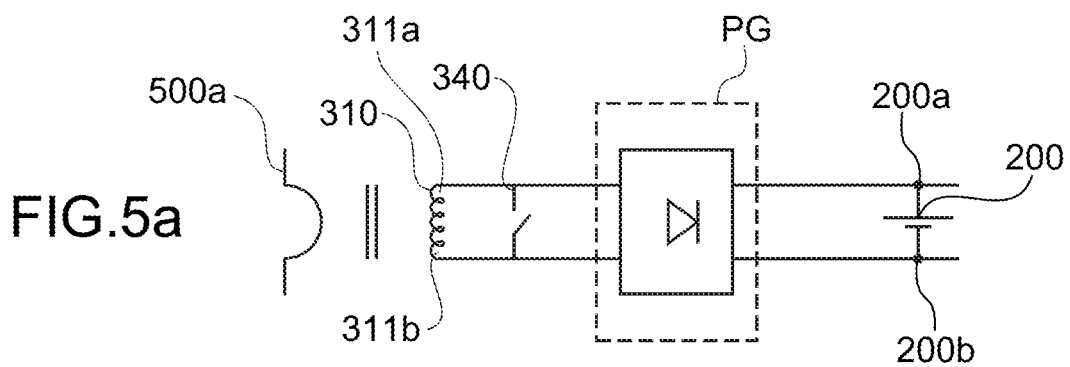
FIGS. 5a to 5d are schematic representations of charging means according to the present invention implementing a Graetz bridge, in particular.

The short-circuiting means 340 can advantageously be arranged to short-circuit 340 the at least one winding 310 (FIG. 5a).

Figure 5B:
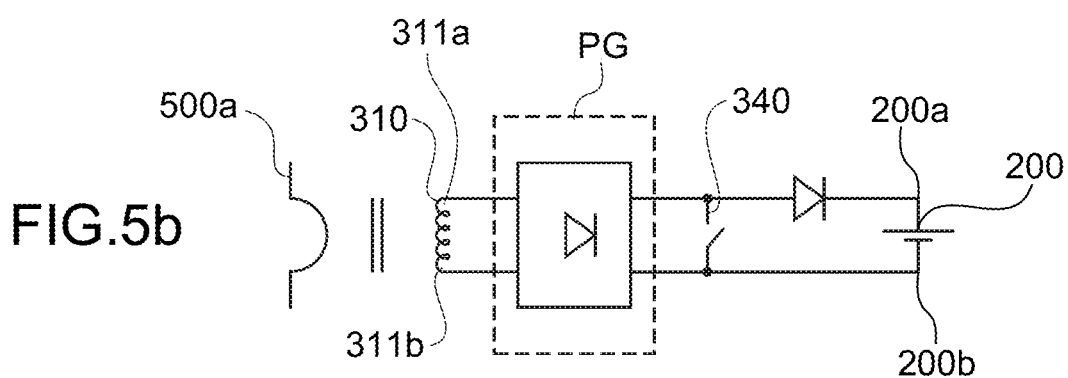

Alternatively, the short-circuiting means 340 can be arranged to short-circuit the current rectifier 320 (FIG. 5b). According to this alternative, the charging means 300 comprise a diode D (FIGS. 2, 3a, 3b, and 5b) for preventing discharging current of the rechargeable battery from flowing in the short-circuiting means as the current rectifier 320 is short-circuited.

The short-circuiting means 340 can comprise a switch, for example a transistor, advantageously driven by a board and/or a calculator.

The charging means 300 can comprise regulating means 360 (FIGS. 5c and 5d) for limiting the charging current. Advantageously, the regulating means are adapted to perform chopping of either of the induced and charging currents. This current chopping function enables the charging current of the rechargeable battery 200 to be regulated, and therefore to adapt to the current flowing in the cable of the electric distribution line. In other words, regulating means 360 impose short-circuit phases of the charging means 300 during the charging phase of the rechargeable battery 200.

Thus, the number of turns of the at least one winding 310 and regulating means 360 can be sized so that the charging current is constant as the line current is within a predetermined range.

For example, the charging current can be set to one ampere for line currents between one hundred and one thousand amperes.

The regulating means 360 can comprise a two-way electronic switch, for example connected in parallel with the at least one winding 310.

The regulating means 360 can alternatively be sandwiched between the current rectifier 320 and rechargeable battery 200.

Chopping either of the induced and charging currents can be performed at a frequency of 20 kHz or more, so as to cut off beyond the audible spectrum.

According to a particularly advantageous embodiment, the ferromagnetic element 370 is sized so as to be saturable. In other words, it is sized to interrupt inductive coupling between the at least one winding 310 and the cable of the electric distribution line 500 as soon as the product of the voltage per turn of the winding(s) by time exceeds a predetermined value, which corresponds to the magnetic material reaching its saturation field. In other words, the ferromagnetic element 370 is sized so as to be brought to saturation at each half-cycle of the current of the line cable to limit energy transfer durations from the cable 500a to the charging means 300.

It is noticeable that this saturation effect is generally an undesirable effect, in particular when the induction effect is implemented for measuring current of a cable of the line. However, within the scope of the present invention, this effect is advantageously taken to advantage to transfer current in the secondary winding 310 only during a limited time which is a fraction of the period of current of the electric line cable. At each reversal of the current direction in the cable, the magnetic material desaturates, which enables coupling to be restored and induced current to be generated in the winding 310. The magnetic material saturates again after a determined time necessary to reach the opposite saturation field.

Sizing of the ferromagnetic element depends on the saturation field thereof, the cross-sectional area of the magnetic material, the number of turns of the winding 310, and voltage across the latter. In such a case, those skilled in the art, with their general knowledge, will be able to size the ferromagnetic element as appropriate. Here, the aim is not to regulate charging current but to regulate charge of the battery via the charging time.

In any case, a saturable ferromagnetic element implies considering smaller dimensions for said element, and consequently, charging means 300 with a lower weight.

Figure 4:
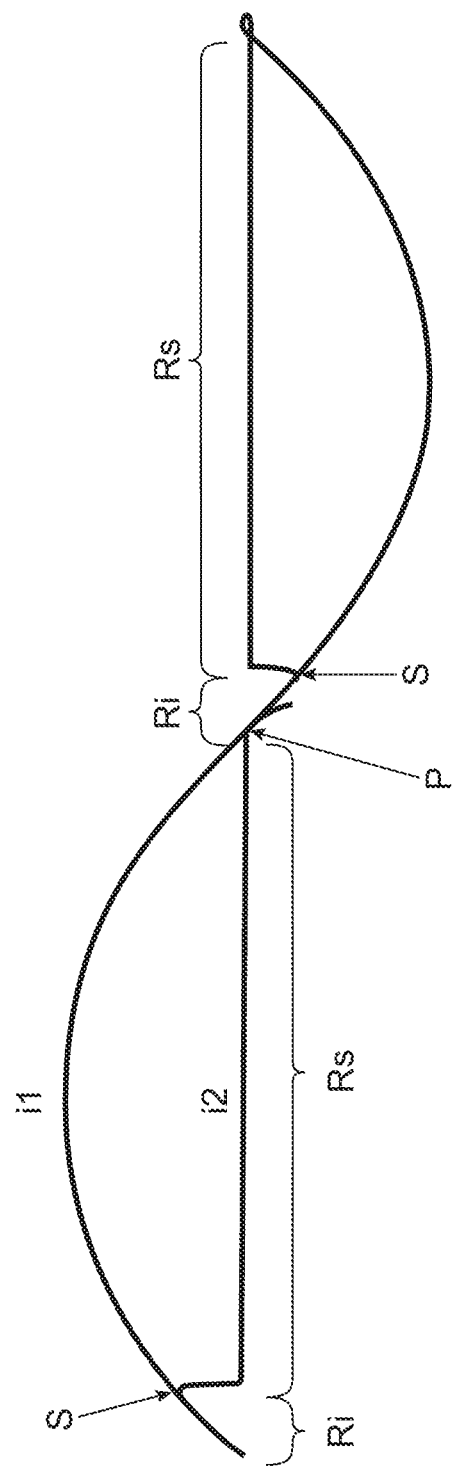
FIG. 4 is the illustration of the saturation effect of the magnetic element during a charging phase, in particular

The principle of saturating the ferromagnetic element is illustrated in FIG. 4.

In particular, the induced current i2 flowing in the at least one winding has two states, respectively called an induction state (Ri) and a saturation state (Rs).

During the induction state Ri at the beginning period of the cable current of the line, the at least one winding 310 and the cable of the line 500 are magnetically coupled and an induced current i2, in phase with the cable current of line 11, flows in the at least one winding 310. During this induction state Ri, the magnetic field in the ferromagnetic element 370 increases until it reaches a so-called saturation magnetic field, and from which the induced current i2 is cancelled (the at least one winding 310 and the cable of the electric distribution line 500 are no longer coupled, point S in FIG. 4). This induced current cancellation instant is a mark of the beginning of the saturation state Rs during which the at least one winding 310 no longer collects energy from the cable of the electric distribution line 500.

Reversal of the line current at point P enables the ferromagnetic element to be desaturated and an induction state Ri to be started again at the beginning of the second half-cycle of the cable current of the line.

Particularly advantageously, the flying device can comprise means for measuring the induced current. Measuring the induced current especially enables the state of charge of the at least one battery to be followed or the signature of the line current (current flowing in cable 500a) to be diagnosed.

The charging means 300 are thus able to distinguish a phase line cable from a neutral cable, for cases where the neutral conductor would be distributed, or from an earth cable.

Means for measuring current can comprise a resistor, for example a shunt.

The electrically propelled flying device 100 according to the present invention is thus advantageously implemented for monitoring electrical distribution lines 500, and can be charged by energy collection therefrom.

The electrically propelled flying device 100 flying in proximity to electric distribution lines also makes it possible to consider carrying smaller capacity and therefore lighter rechargeable batteries.

Moreover, neutralizing charging means with short-circuiting means enables the charging current to be controlled, and then cancelled when the required charge level in the battery 200 is reached.

Finally, measuring induced current at the second winding can also be used to obtain information on the primary current signature so as to diagnose the electric distribution lines being monitored.

The charging means 300 are given by way of example in FIGS. 5a-5d, 6, 7a-7g, 8a, 8b, 9, 10 and 11.

In particular, FIGS. 5a to 5d illustrate charging means 300 comprising a single winding 310 (implementing several windings in series is however not excluded), and the current rectifier 320 of which comprises a Graetz bridge PG. A Graetz bridge is an assembly of four bridge-connected diodes. The Graetz bridge PG enables an alternating current to be rectified into a direct current (that is flowing in a single direction).

According to this example, the circuiting means 340 can be arranged to short-circuit the winding 310 (FIG. 5a), or current rectifier 320 (FIG. 5b). The short-circuiting means 340 can comprise a switch, in particular a controlled switch, for example a MOS transistor.

Figure 5C:
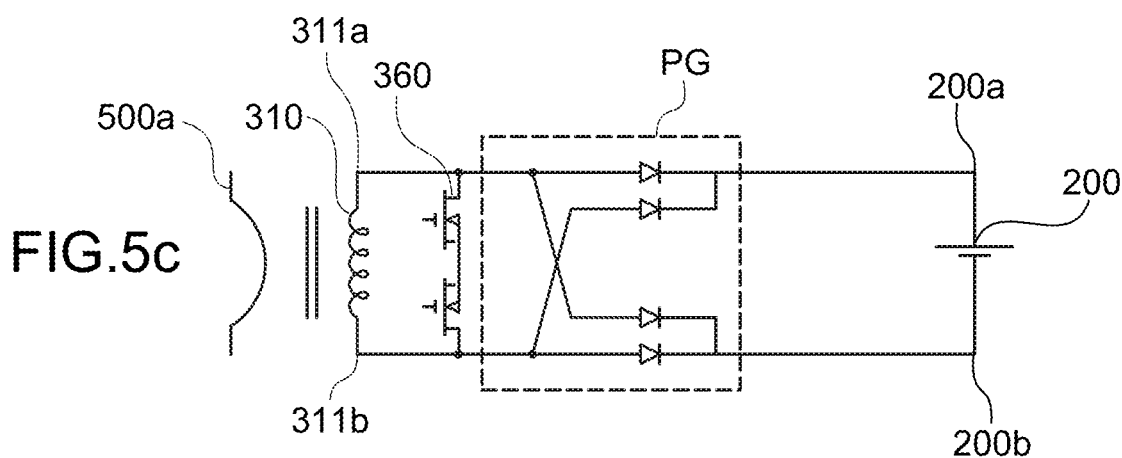
Figure 5D:
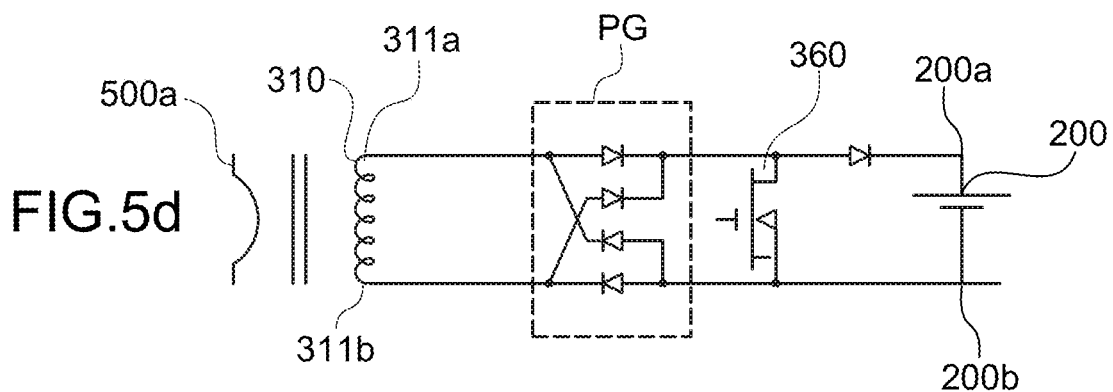

Still according to this example, FIGS. 5c and 5d illustrate different arrangements of regulating means 360.

In particular, in FIG. 5c, the regulating means 360 can comprise a two-way switch placed in parallel with the winding 310 (in other words upstream of the current rectifier). A two-way switch comprises for example two MOS transistors.

In FIG. 5d, the regulating means 360 comprise a switch disposed at the output of the current rectifier 320.

Figure 6:
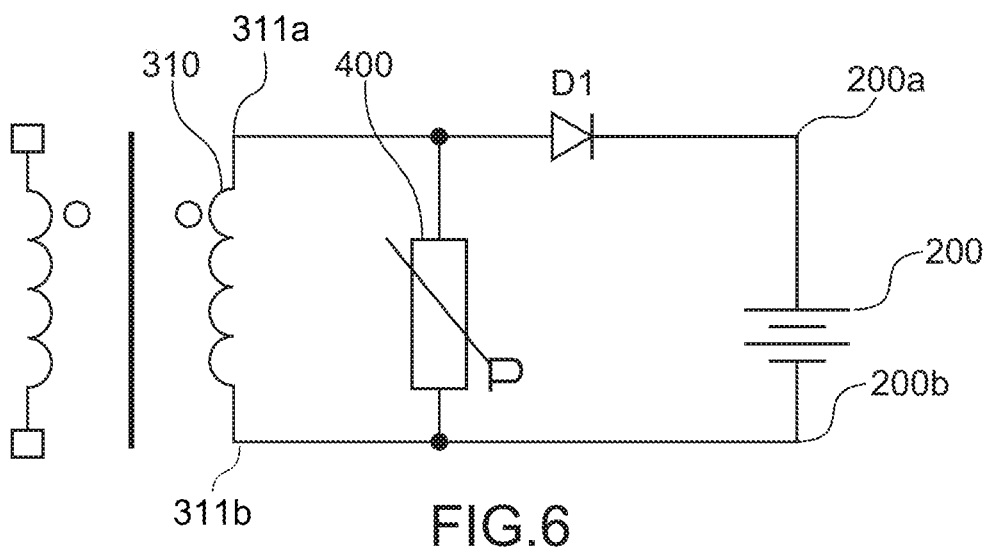
FIG. 6 is a schematic representation of the charging means comprising a rectifier made of a single diode, called a forward diode.

Alternatively, the rectifier 320 can comprise a diode, called a forward diode D1 (FIG. 6).

In particular, the forward diode D1 can be arranged according to a polarity for charging the at least one battery by the charging current.

According to this configuration, the at least one battery 200 and the charging means form a closed circuit.

Under these conditions, as the ferromagnetic element 370 is implemented, it can be advantageous to place clipping means 400 electrically connected in parallel with the at least one winding 310 for desaturating said element upon reversal of the line current. Clipping means are especially adapted to let a negative induced current flow in the closed loop formed by said clipping means and the at least one winding 310, and for desaturating the ferromagnetic element 370.

The clipping means 400 can especially comprise a voltage-dependent resistor (VDR). The voltage-dependent resistor, also called varistor, has in particular a large resistance below a certain voltage threshold at its terminals and has a low resistance beyond this voltage.

Still alternatively, the rectifier 320 can comprise the forward diode D1 and another diode, called a reverse diode D2.

In particular, the forward diode D1 and reverse diode D2 are each arranged according to a polarity for charging the at least one battery by the charging current.

According to this configuration, the at least one winding can be connected to the at least one battery 200 via two branches called a first branch 312a and a second branch 312b respectively. Especially, the forward diode D1 and reverse diode D2 are respectively mounted to the first branch 312a and the second branch 312b (or vice-versa).

FIGS. 7a to 7g illustrate a first example implementing the forward D1 and reverse D2 diodes.

In this first example, the at least one winding 310 comprises two windings called a first winding 310a and a second winding 310b respectively connected in series at a common node N.

The common node N is, according to this example, connected by a main branch 312 to a terminal, for example the negative terminal, of the rechargeable battery 200.

The first end 311a and the second end 311b of the at least one winding 310, are respectively connected, along the first branch 312a and the second branch 312b to the other terminal, for example the positive terminal, of the at least one rechargeable battery.

Figure 7A:
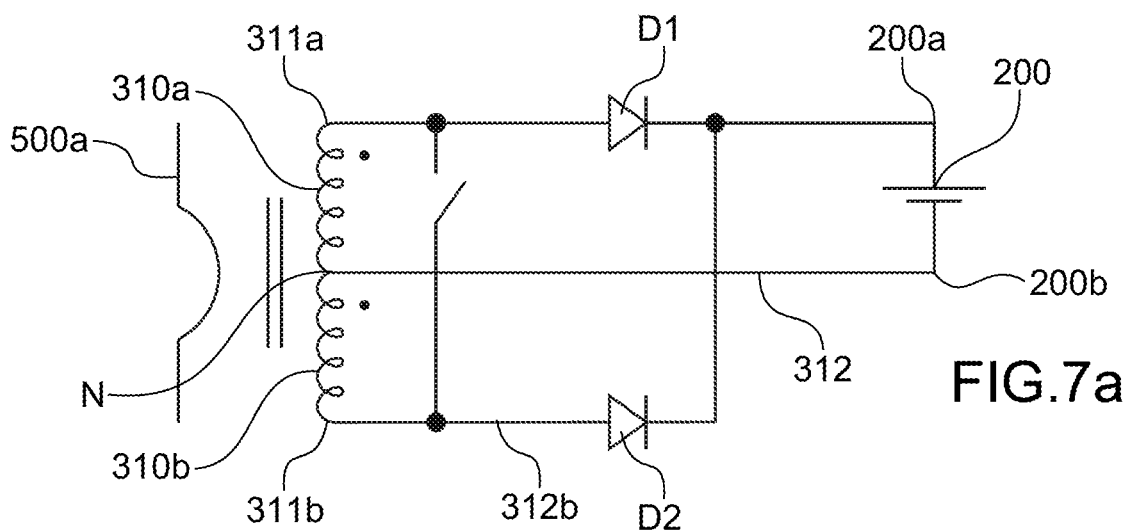
FIGS. 7a to 7g are schematic representations of charging means according to a first example of the present invention implementing a two-diode rectifier, in this example the at least one winding comprises a first and a second winding, in particular.

The short-circuiting means 340 can comprise a switch for joining the first 311a and second 311b ends (FIG. 7a).

Figure 7B:
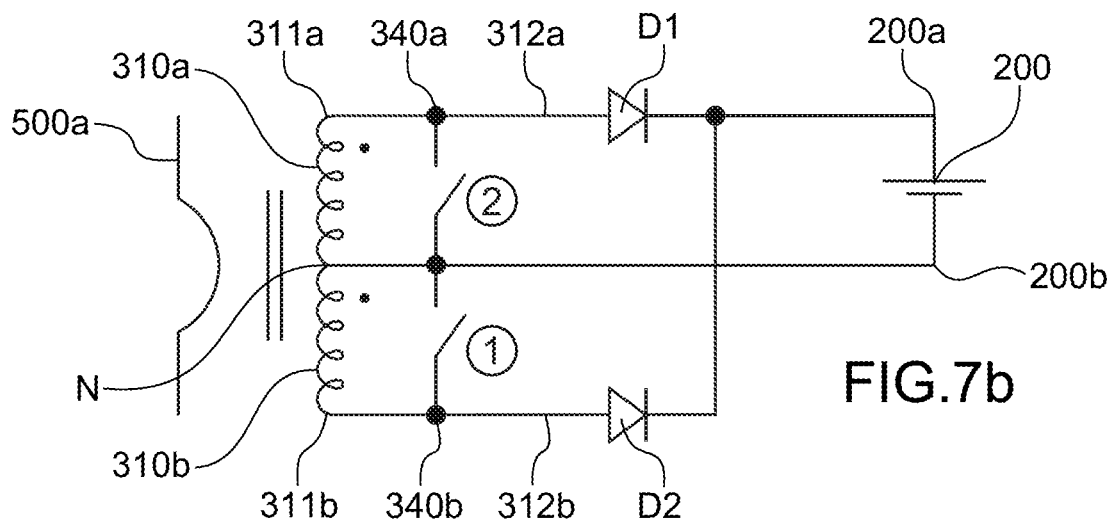
Figure 7C:
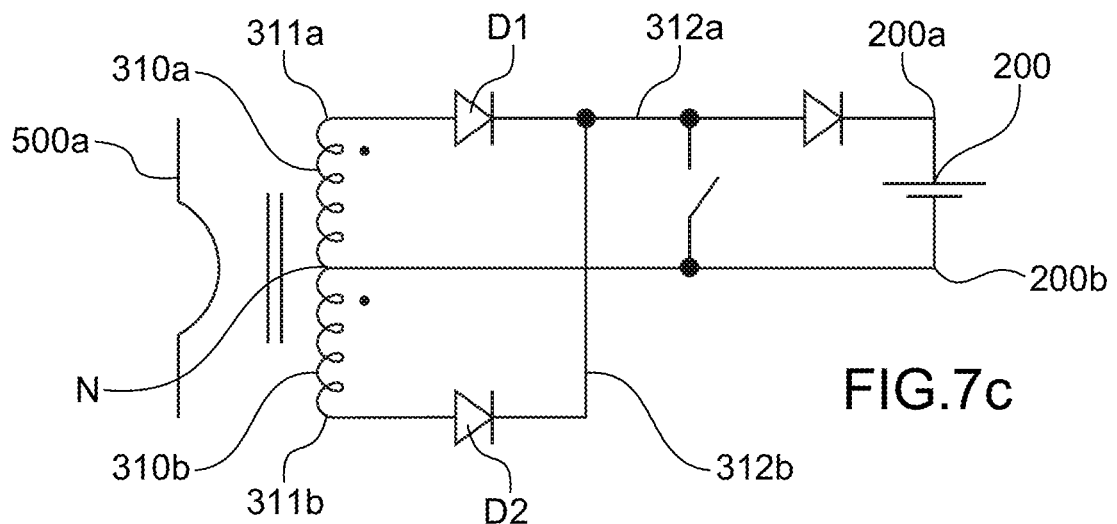

Alternatively, the short-circuiting means 340 can comprise a first switch 340a and a second switch 340b for each connecting node N with, respectively, the first end 311a and second end 311b (FIG. 7b).

Still alternatively (FIG. 7c), the short-circuiting means can comprise a switch for connecting node N with the output of each of both diodes D1 and D2. A diode D, connecting the output of both diodes and the positive terminal of the rechargeable battery, can be also be considered in order to prevent a discharging current of the rechargeable battery from flowing in the short-circuiting means as the current rectifier 320 is short-circuited.

Figure 7D:
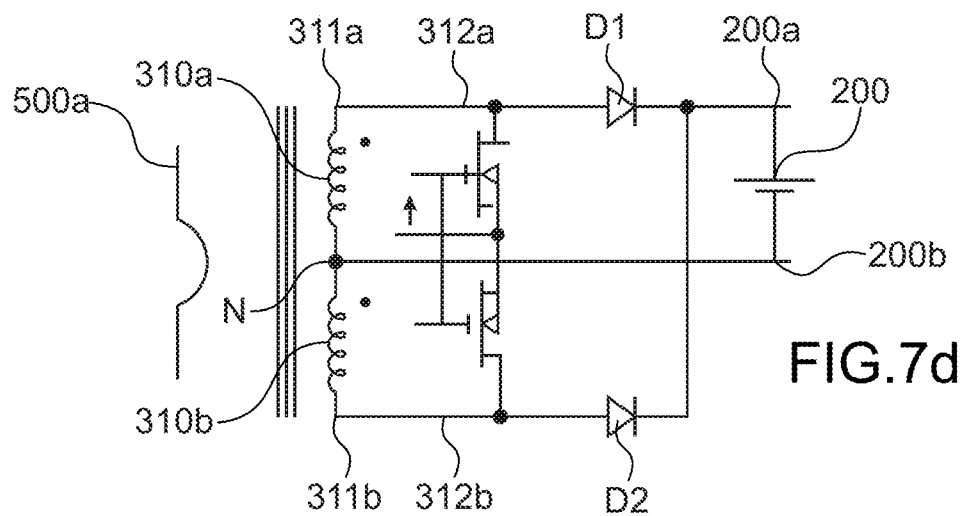
Figure 7E:
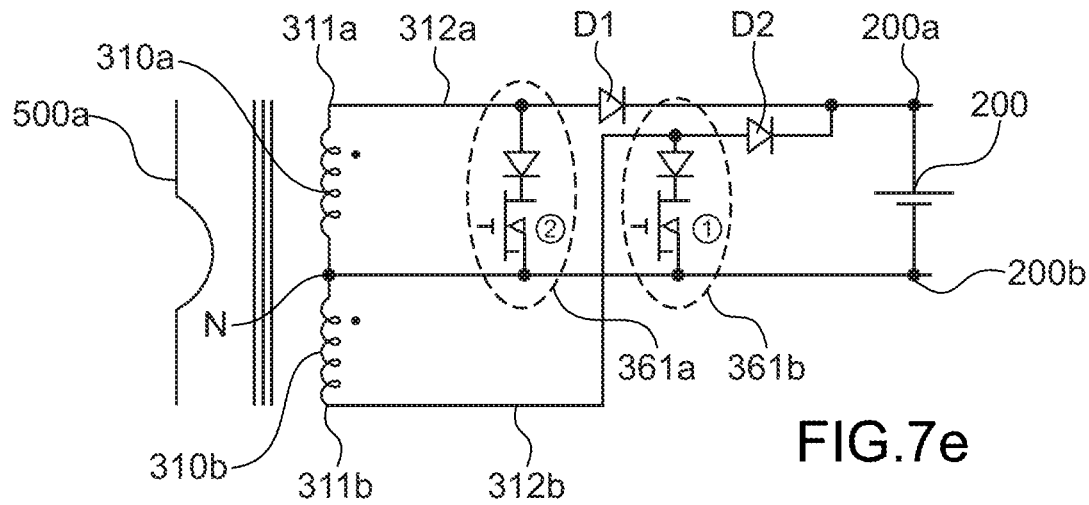
Figure 7F:
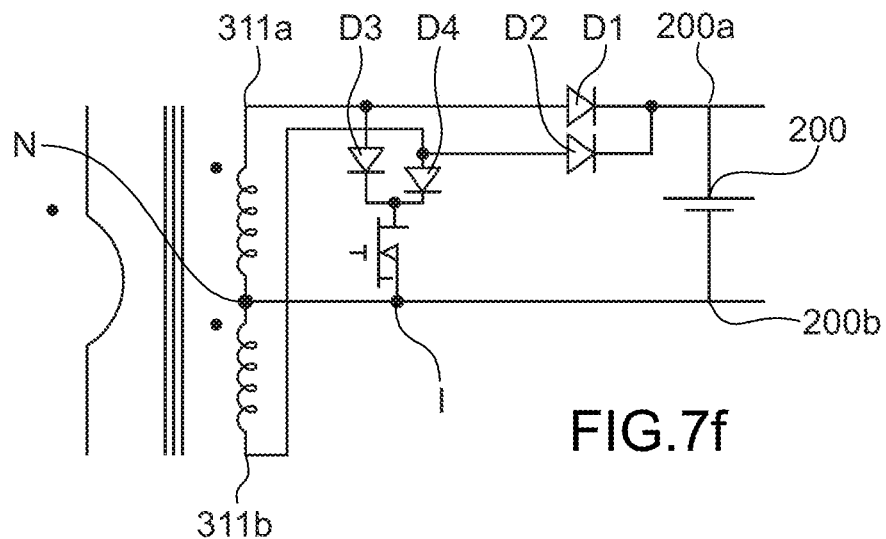

FIGS. 7d to 7f represent examples of regulating means 360 as two windings are considered.

In particular, in FIG. 7d, regulating means 360 comprise a voltage and current two-way switch connecting the first end 311a and second end 311b. The two-way switch can then comprise two N-type MOS transistors. A gate voltage applied to the gate of transistors, greater than the threshold voltage of both transistors, enables the first 311a and second 311b ends to be short-circuited.

Alternatively, as represented in FIG. 7e, the regulating means 360 can comprise two switch off modules called a first module 361a and a second module 361b respectively, interconnecting node N, to the first end 311a and second end 311b respectively.

The first module 361a and second module 361b each comprise a diode connected in series with a switch, in particular, a MOS type transistor.

According to this arrangement, the transistor of the first module 361a short-circuits the first end 311a and the node N as the current generated by the first winding 310a is negative. Equivalently, the transistor of the second module 361b short-circuits the second end 311b and the node N as the current generated by the second winding 310b is positive.

According still another alternative represented in FIG. 7f, the regulating means 360 can comprise a third diode D3, a fourth diode D4 the inputs of which are respectively connected to the first end 311a and second end 311b. The diodes D3 and D4 also comprise a common output connected to node N via a switch I, said switch being advantageously a MOS transistor.

Figure 7G:
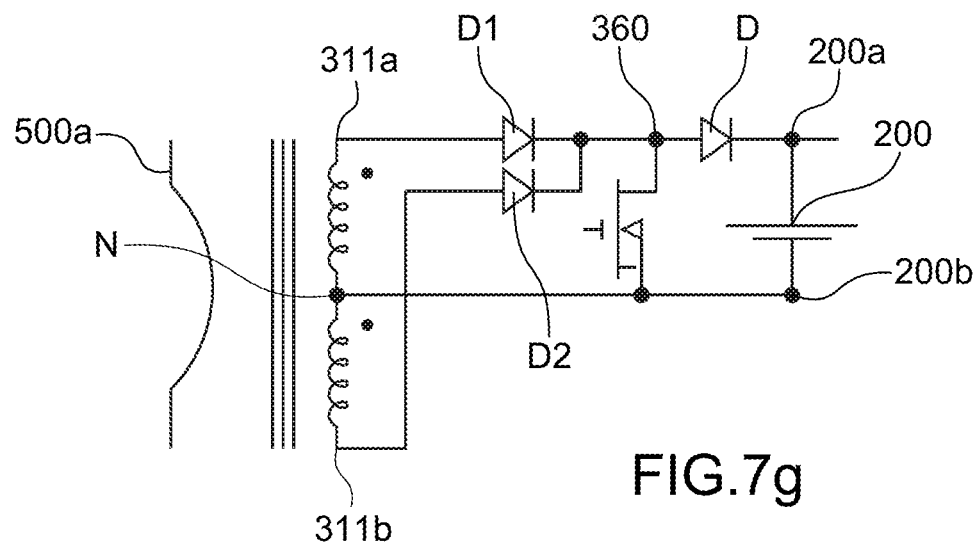

Still according to another alternative illustrated in FIG. 7g, the regulating means 360 can be arranged to connect node N with the output of the first D1 and second D2 diodes. A diode D, connecting the output of both diodes and the positive terminal of the rechargeable battery, can also be considered in order to prevent a discharging current of the rechargeable battery from flowing in the short-circuiting means as the current rectifier 320 is short-circuited.

Generally, an arrangement comprising the first winding and second winding enables losses to be minimized. Indeed, according to this configuration, induced current passes only through a single diode, and is therefore only affected by losses associated with its passage through said diode.

Figure 8A:
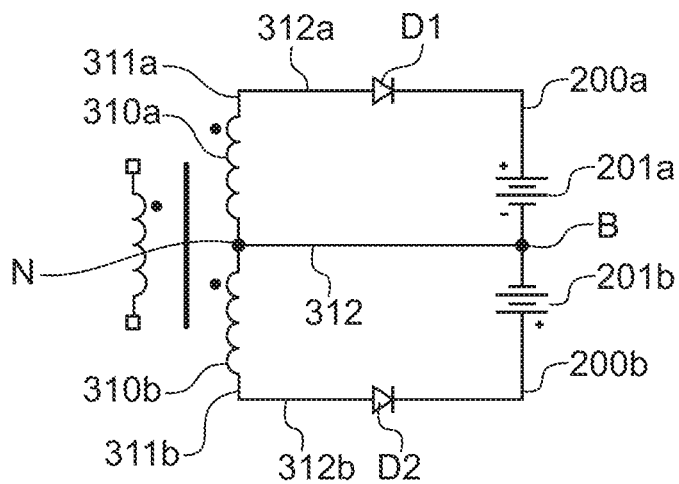
FIGS. 8a and 8b are schematic representations of charging means according to two alternatives of a second example of the present invention implementing a two-diode rectifier, in this example the at least one winding comprises a first and a second winding, and the at least one battery is made of a first and a second batteries connected at a node B, especially according to the first alternative represented in FIG. 8a, both batteries are connected according to opposite polarities, and according to the second alternative represented in FIG. 8b, both batteries are connected in series.
Figure 8B:
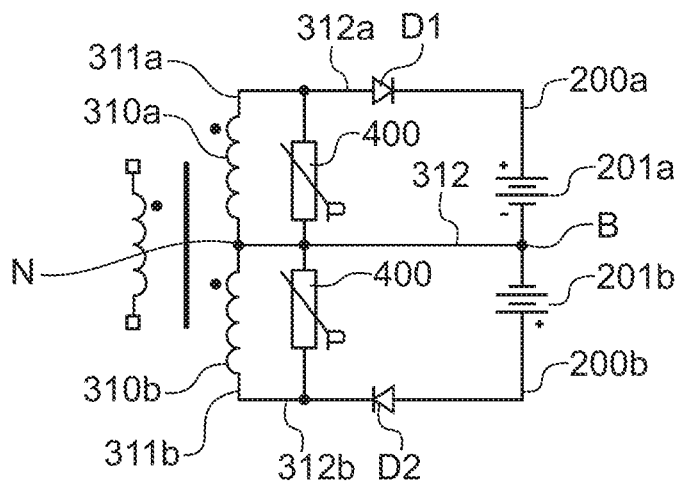

FIGS. 8a and 8b illustrate two alternatives of a second example implementing the forward D1 and reverse D2 diodes.

In this second example, the at least one battery comprises a first battery 201a and second battery 201b connected at a common node B.

The at least one winding 310 comprises the first winding 310a and second winding 310b arranged in series at a common node N.

The main branch 312 connects node N to node B, whereas the first branch 312a connects the first end 311a to one of the main terminals, and the second branch 312b connects the second end 311b to the other of the main terminals.

The first alternative of this second example illustrated in FIG. 8a sets forth the first battery 201a and second battery 201b connected according to opposite polarities.

The second alternative of this second example illustrated in FIG. 8b sets forth the first battery 201a and second battery 201b arranged in series.

According to this second example, the first 310a and second 310b windings can be each implemented with the ferromagnetic element 370.

Under these conditions, and more particularly within the scope of the second alternative, the clipping means 400 described in connection with FIG. 6 can advantageously be implemented.

Figure 9:
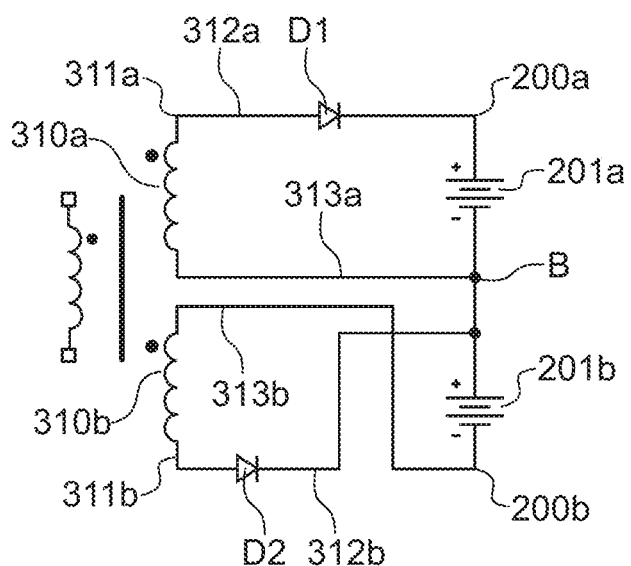
FIG. 9 is a schematic representation of charging means according to a third example implementing a two-diode rectifier, in this example the at least one winding comprises the first and second windings free of a common node, and the at least one battery is made of a first and a second battery connected in series.

FIG. 9 illustrates a third example implementing the forward D1 and reverse D2 diodes.

In this third example, the at least one battery comprises a first battery 201a and second battery 201b joined at a common node B, and arranged in series.

The at least one winding 310 also comprises the first winding 310a and second winding 310b. The latter are free of a common node.

The first winding 310a is connected along the first branch 312a to the first terminal 200a, and along another branch, called a first secondary branch 313a to the common node B.

The second winding 310b is connected along the second branch 312b to the common node B, and along another branch, called a second secondary branch 313b, to the second terminal 200b.

Figure 10:
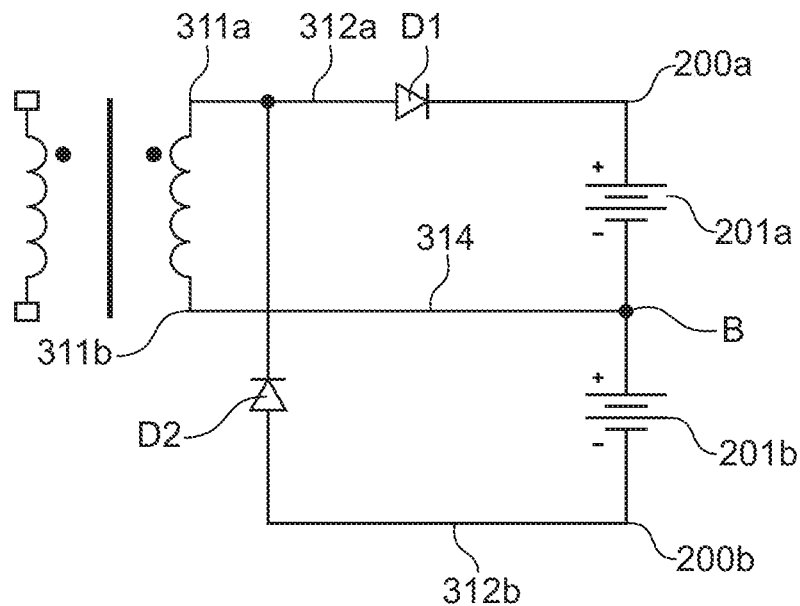
FIG. 10 is a schematic representation of charging means according to a fourth example implementing a two-diode rectifier, in this example the at least one battery is made of a first and a second battery connected in series.

FIG. 10 illustrates a fourth example implementing the forward D1 and reverse D2 diodes.

In this fourth example, the at least one battery 200 comprises the first battery 201a and second battery 201b connected in series and has (have) a common node B.

Still according to this fourth example, the first branch 312a and second branch 312b connect the first end 311a, respectively, to the first terminal 201a and second terminal 201b. A third branch 314 connects the second end 311b to the common node B.

The forward diode D1 thus enables the first battery to be charged with the positive part of the induced current, and the reverse diode D2 enables the second battery to be charged with the negative part of the induced current.

Figure 11:
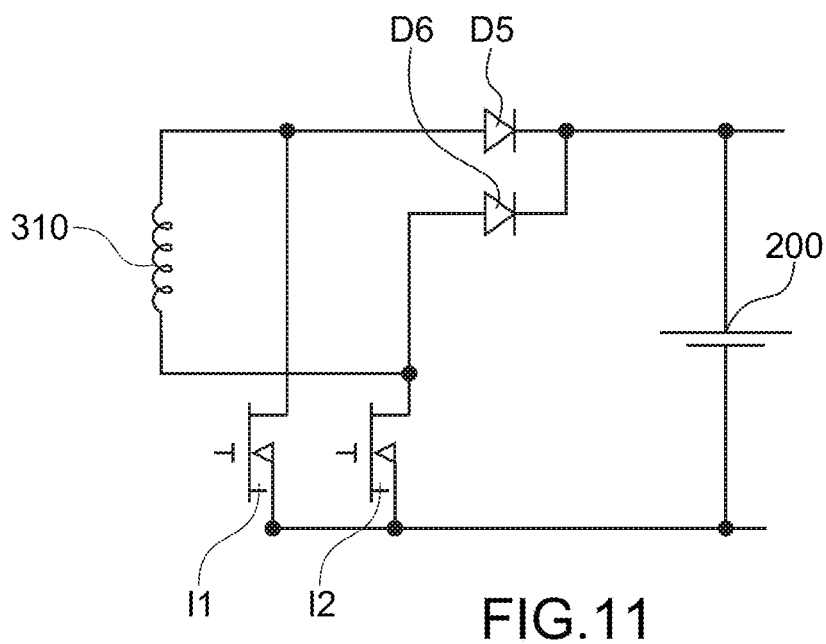
FIG. 11 is a schematic representation of charging means according to the present invention involving only one winding and a modified Graetz bridge.

FIG. 11 represents another exemplary embodiment of the charging means 300 according to the present invention. According to this other example, the charging means comprise a single winding 310 each end of which is connected with the input of a different diode called a diode D5 and a diode D6 respectively. Both diodes D5 and D6 have a common output connected to the positive terminal of the rechargeable battery 200. The charging means 300 also comprise two switches I1 and I2 each connecting an end of the winding to the negative terminal of the rechargeable battery.

Both switches are for example MOS transistors. If the latter are OFF transistors, they behave as diodes thus making it possible to charge the rechargeable battery.

On the contrary, if they are ON, the winding 310 is short-circuited.

Thus, according to the present invention, the electrically propelled flying device comprises means adapted to charge its rechargeable battery at an electric distribution line.

Furthermore, as charging said battery can be performed by hooking the device 100 to one of the cables of the line 500, it is not necessary to provide charging points specific to the charging means of the present invention.

Since charging the rechargeable battery can be performed at any point of the cables of the electric distribution line, it is in no way necessary to provide a high capacity battery.

The invention claimed is:

1. An electrically propelled flying device comprising:
a mechanical coupling means arranged to cooperate with a cable of an electric distribution line so as to hold the flying device integral with the cable in a rest position;
at least one rechargeable battery for supplying power necessary to electrically propel the flying device; and
means for charging the at least one battery included in the mechanical coupling means, the charging means being configured, as soon as a so-called line current passes through the cable, to cooperate with said cable in order to charge the at least one battery, the charging means being disposed in a Faraday cage, the Faraday cage being provided with an electrode arranged to be in contact with the cable as soon as the flying device is hooked to the cable.

2. The device according to claim 1, wherein the mechanical coupling means comprises a hook for hooking the flying device to the cable.

3. The device according to claim 1, wherein the mechanical coupling means comprises a clamp provided with at least two clamp grippers to hook the flying device to the cable.

4. The device according to claim 1, wherein the mechanical coupling means is fitted with a rolling means arranged to enable the flying device to be moved along the cable of the distribution line.

5. The device according to claim 1, wherein the charging means comprise at least one winding having two main ends including a first end and a second end respectively, the at least one winding being arranged to be magnetically coupled with the cable as soon as a cooperation between the mechanical coupling means and the cable occurs so as to inductively cause a so-called induced current, to flow in the at least one winding and for charging the at least one battery.

6. The device according to claim 5, wherein the mechanical coupling means comprises a hook for hooking the flying device to the cable and the at least one winding forms the hook.

7. The device according to claim 5, wherein the mechanical coupling means comprises a clamp provided with at least two clamp grippers to hook the flying device to the cable and wherein the at least one winding forms at least one of the grippers of the clamp.

8. The device according to claim 5, wherein the charging means comprise a current rectifier arranged to rectify the induced current into a direct current (DC) component current, called a charging current, before being injected into the at least one battery.

9. The device according to claim 8, wherein the rectifier comprises at least one diode.

10. The device according to claim 5, wherein the charging means comprise short-circuiting means configured to short-circuit the charging means.

11. The device according to claim 10, wherein the short-circuiting means are configured to short-circuit the charging means as soon as the at least one battery, during a charging phase, has reached a charge at least equal to a predetermined charge.

12. The device according to claim 5, wherein the short-circuiting means are arranged to short-circuit the at least one winding.

13. The device according to claim 12, wherein the charging means comprise a current rectifier arranged to rectify the induced current into a direct current (DC) component current, called a charging current, before being injected into the at least one battery, and the short-circuiting means are arranged to short-circuit the current rectifier.

14. The device according to claim 5, wherein the charging means comprise regulating means for limiting the charging current.

15. The device according to claim 14, wherein the regulating means are configured to perform chopping of either of the induced and charging currents.

* * * * *